Feb. 9, 1926.
J. O'NEIL
ANIMAL TRAP
Filed Dec. 10, 1923
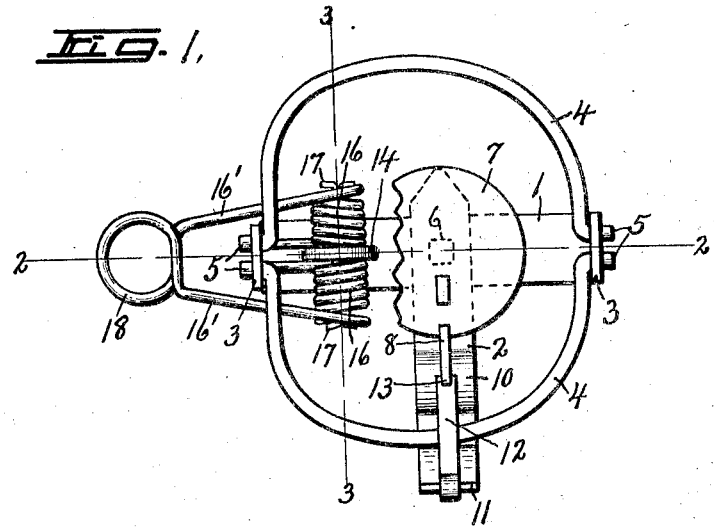
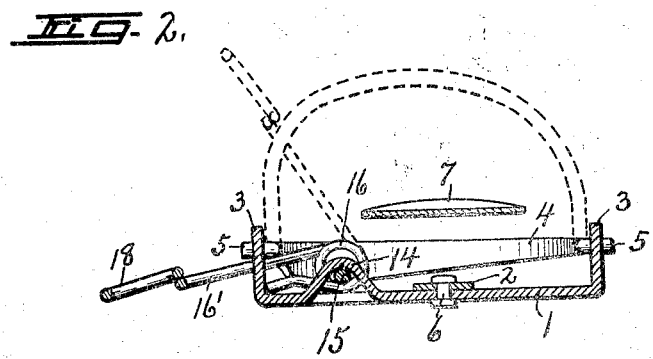
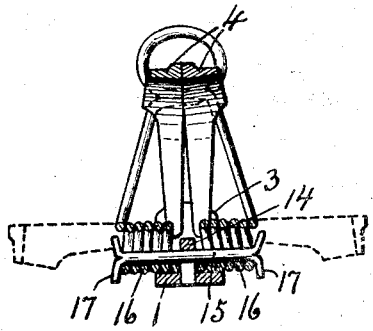
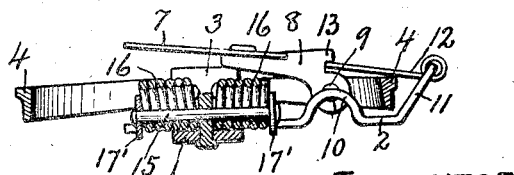
INVENTOR
J. O'Neil
BY Howard P. Denison
ATTORNEY Patented Feb. 9, 1926.

1,572,358

UNITED STATES PATENT OFFICE.

JEREMIAH O'NEIL, OF ONEIDA, NEW YORK, ASSIGNOR, BY MESNE ASSIGNMENTS, TO ANIMAL TRAP COMPANY OF AMERICA, OF LITITZ, PENNSYLVANIA, A CORPORATION OF PENNSYLVANIA.

ANIMAL TRAP.

Application filed December 10, 1923. Serial No. 679,752.

*To all whom it may concern:*

Be it known that I, JEREMIAH O'NEIL, a citizen of the United States of America, of Oneida, in the county of Madison, in the State of New York, have invented new and useful Improvements in Animal Traps, of which the following, taken in connection with the accompanying drawings, is a full, clear, and exact description.

This invention relates to an animal trap in which a pair of cooperative jaws are pivotally mounted upon a supporting frame carrying releasable means for holding the jaws in their open or set positions, and spring-actuated means for forcibly closing the jaws when the holding means is released by an animal or from other cause.

It is found that coiled wire springs for operating the jaws are far more efficient than flat or leaf springs, in that they retain their resiliency for a much longer period of time, are less liable to be broken by hard or careless usage, may be more conveniently, expeditiously and economically assembled in the trap by avoiding the use of rivets and similar labor consuming fastening means and enable the trap as a whole, to be made less cumbersome and weighty without sacrificing strength, durability or efficiency.

I am aware that various forms of coiled wire springs for operating the jaws have heretofore been proposed of which one type consists of separate helices mounted in co-axial spaced relation upon a suitable supporting pin or pintle which in turn is mounted in suitable bearings on the main supporting frame.

This invention has to do more particularly with the latter type of spring and its specific relation to the central lengthwise jaw-supporting bar of the frame whereby the outer ends of the separate coils or helices are supported clear of the frame to avoid the use of outstanding bearings therefor beyond the opposite longitudinal edges of the central frame bar, the object being not only to reduce the weight and cost of manufacture of the trap, but also to increase the resiliency and self-adjustability of the outer ends of the coils to enable both jaws of the trap to close with equal force and speed directly over the longitudinal center of the jaw-supporting bar.

This object is further carried out by the tangential extension of the outermost helices of both coils across the outer edges of the corresponding ends of the jaws for exerting closing action thereon, and at the same time permitting the longitudinally extending arms of the wire to be bent into the form of a loop which may serve as a handle for tensioning the springs when setting the trap.

In other words, the main object is to enable the outer ends and corresponding arms of the coils to automatically adjust themselves according to the resistance of the jaws and thereby to act with greater freedom than would be possible if the outer ends of the coils were rigidly held against relative movement by portions of the frame.

Another object is to permit the spring coils to be supported wholly within or between the opposite ends of the jaws and particularly within the marginal compass of the jaws when set so that the tangential arms of the coils may extend outwardly under the adjacent ends of the set jaws in converging and intersecting lines to cause a quicker and firm closing of the jaws.

Other objects and uses relating ot specific parts of the trap will be brought out in the following description:—

In the drawings:

Figure 1 is a top plan of an animal trap embodying the various features of my invention, opened or set ready for use, portions of the bait pan being broken away to show more clearly the underlying spring coils.

Figures 2 and 3 are respectively, a longitudinal vertical sectional view and a transverse vertical sectional view taken on lines 2—2, Figure 1 and 3—3, Figure 1, except that in Figure 3, the jaws are shown as closed, the dotted lines in Figure 2 indicating the closed position while the dotted lines in Figure 3 indicate the open position of the jaws.

Figure 4 is a sectional view similar to Figure 3, except that the trap is set and that the ends of the coil-retaining pintle are provided with washer heads instead of split heads as shown in Figures 1, 2 and 3.

The main supporting frame consists of a lengthwise bar —1— preferably of strap metal and a cross bar —2— of similar metal, the main bar —1— being provided with upturned apertured ends —3— for receiving and supporting a pair of similar cooperative jaws —4— both of which are provided with outturned end pintles —5— journaled in the apertures of the lugs or ears —3— to swing about separate axes parallel with and at opposite sides of the longitudinal center of the bar —1—.

The cross bar —2— is rigidly secured by a rivet —6—, or suitable fastening means, to the upper face of the lengthwise bar —1— between the upturned ears or lugs —3— and therefore, between the ends of the jaws —4— but slightly nearer to one end than to the opposite end of said jaws to permit the spring coils to be conveniently mounted on the central lengthwise bar between the cross bar —2— and one end of the jaws for a purpose as will be hereinafter more fully described.

A suitable bait pan —7— is provided with an extension —8— suitably fulcrumed at —9— to an upturned portion —10— of the cross bar and preferably in a lengthwise slot which is cut in the upturned portion —10—.

The cross bar —2— extends some distance beyond the fulcrum —9— and terminates in an upwardly and outwardly inclined ear or lug —11— to which is pivoted one end of a detent —12— having its other end adapted to engage a shoulder —13— on the heel of the extension —8— to hold the jaws in their open or set positions, it being understood that under these conditions, the detent —12— will extend across the upper edge of the adjacent jaw —4— which will then be interposed between the extension —8— and lug —11—.

It will be understood from the foregoing description that the cross bar —2— extends laterally from the cross bar —1— beyond the arc and in the path of movement of the corresponding jaw —4— and therefore, serves as a stop for limiting the opening movement of the jaws to substantially a horizontal plane.

A portion of the lengthwise bar —1— between the cross bar —2— and one of the end lugs —3— is detached and struck up from said bar above the upper face thereof to form a retaining loop —14— for a transversely extending pin or pintle —15— which in turn serves as a means for retaining a pair of coiled springs —16— in axial alinement upon the bar —1— at opposite sides of the loop —14—.

Each coil spring preferably consists of a similar number of convolutions or helices of spring wire arranged at opposite sides of the loop —14— in close relation thereto and in alinement therewith for receiving the retaining pin —15— which is passed through said loop and through both coils so as to rest against the top of the loop and also against the bottom of the coils to hold the latter against the upper face of the main bar —1—, the adjacent ends of both coils being extended outwardly along and upon the upper face of the main bar —1— and preferably against the inner face of the adjacent upturned lug or ear —3— so as to have a bearing upon the upper end of the main bar to resist downward movement and to cooperate with the pin —15— in holding the coils against undue displacement lengthwise of the main bar.

The coils —16— preferably extend axially beyond opposite edges of the lengthwise bar —1—, Figures 1 and 3 while the ends of the pin —15— preferably extend entirely through the coils and are bifurcated and upset at —17— as shown in Figures 1, 2 and 3 to hold the coils against axial displacement from the bar —1—, or, as shown in Figure 4, the ends of the pin —15— may be provided with washer heads —17'— to serve the same purpose.

As illustrated, the heads —17— and —17'— engage the outer ends of the coils below the axis thereof thus permitting free compression and extension of the outer ends of the coils in setting and releasing the jaws of the trap.

The outer ends of the coils are extended tangentially and outwardly lengthwise of the bar —1— in converging lines, across the outer edges of and beyond the adjacent ends of the jaws —4— so as to intersect each other and return in the form of a loop —18— which forms a handle by which the arms as —16'— of the coils may be depressed and thereby placed under tension below the plane of the jaw pintles —5— when setting the trap for tensioning the arms —16'— across the lower edges of the adacent ends of the set jaws.

The particular object in utilizing the outer end extensions —16'— of the coiled springs as the means for operating the jaws —4— together with the outwardly converging relation of those arms is to produce an accelerated closing movement of the jaws by reason of their gradually increasing compression action on the jaws as their points of contact change toward the converging ends during such closing movement. That is, when the trap is set, the arms —16'— engage the jaws near their points of widest separation but when the jaws are released the closing action of the arms —16'— causes the points of engagement of said arms to gradually shift toward their converging ends, thereby not only increasing the compression power applied at the beginning of the closing movement but also accelerating such movement and assuring a more instantaneous trapping of the animal than would be possible if the arms —16'— were parallel or outwardly divergent

I claim:

1. An animal trap comprising a frame having a lengthwise bar and a cross bar, a pair of jaws pivoted to the lengthwise bar at opposite sides of the cross bar, releasable means mounted on the cross bar for holding the jaws open, coaxial spring coils having adjacent ends engaged with the lengthwise frame bar between the cross bar and one end of the jaws and extended beyond opposite sides of the lengthwise bar, the outer ends of said coils being extended across the outer edges of one end of the jaws in outwardly converging lines.

2. An animal trap comprising a frame, pivotally mounted jaws on the frame, a pair of endwise separated coil springs for actuating said jaws, releasable means for holding said jaws open, a rod passing through said springs, a bearing for the rod on the frame between the springs, and means carried by the rod and engaging the outer ends of the springs to retain them on the rod.

3. An animal trap comprising a frame, pivotally mounted jaws on the frame, a pair of endwise separated coil springs for actuating said jaws, releasable means for holding said jaws open, a rod passing through said springs, means punched up from the bottom of the frame to form a bearing for the rod between the springs, and means carried by the rod and engaging the outer ends of the springs to retain them on the rod.

In witness whereof I have hereunto set my hand this 30th day of November, 1923.

JEREMIAH O'NEIL.